(12) United States Patent
Ernst et al.

(10) Patent No.: US 11,289,242 B2
(45) Date of Patent: Mar. 29, 2022

(54) METHOD AND APPARATUS FOR PRODUCING AN EXTRUDATE

(71) Applicant: LEONI KABEL GMBH, Nuremberg (DE)

(72) Inventors: Christian Ernst, Weissenburg (DE); Sebastian Goss, Roth (DE); Andreas Schreiber, Roth (DE); Joerg Wenzel, Roth (DE)

(73) Assignee: LEONI Kabel GmbH, Nuremberg (DE)

( * ) Notice: Subject to any disclaimer, the term of this patent is extended or adjusted under 35 U.S.C. 154(b) by 302 days.

(21) Appl. No.: 16/461,408

(22) PCT Filed: Sep. 14, 2017

(86) PCT No.: PCT/EP2017/073112
§ 371 (c)(1),
(2) Date: May 16, 2019

(87) PCT Pub. No.: WO2018/091166
PCT Pub. Date: May 24, 2018

(65) Prior Publication Data
US 2019/0344488 A1 Nov. 14, 2019

(30) Foreign Application Priority Data
Nov. 16, 2016 (DE) ...................... 10 2016 222 542.1

(51) Int. Cl.
*H01B 13/24* (2006.01)
*B29C 48/154* (2019.01)
(Continued)

(52) U.S. Cl.
CPC ........... *H01B 13/24* (2013.01); *B29C 43/226* (2013.01); *B29C 48/0011* (2019.02);
(Continued)

(58) Field of Classification Search
CPC . B29C 48/001; B29C 48/0011; B29C 48/002; B29C 48/154; H01B 13/06; H01B 13/14; H01B 13/145
See application file for complete search history.

(56) References Cited

U.S. PATENT DOCUMENTS

| 3,243,850 | A | * | 4/1966 | Zieg | ................... B29C 49/0021 425/237 |
| 3,751,541 | A | | 8/1973 | Hegler | |
| 3,881,851 | A | * | 5/1975 | Allanic | ............... H01B 13/067 425/113 |
| 4,365,948 | A | | 12/1982 | Chaplain | |

(Continued)

FOREIGN PATENT DOCUMENTS

| CN | 1072630 A | 6/1993 |
| CN | 1105316 A | 7/1995 |

(Continued)

*Primary Examiner* — Galen H Hauth
(74) *Attorney, Agent, or Firm* — Laurence A. Greenberg; Werner H. Stemer; Ralph E. Locher

(57) ABSTRACT

A method for producing an elongated article with a sheath. The sheath is extruded with a predetermined wall thickness in an extrusion unit. Following the extrusion unit in a feeding direction, a part of the still moldable material is built up with the aid of a molding unit during a molding process such that a molded part forms integrally on the sheath. The molding unit is moved according to the following working cycle: the molding unit is accelerated from a starting position in the feeding direction, then it is advanced in the direction of the elongated article and the molded part is formed, the molding unit is withdrawn from the elongated article, and the molding unit is decelerated and moved from an end position, counter to the feeding direction, back in the direction of the starting position.

18 Claims, 3 Drawing Sheets

(51) Int. Cl.
  *B29C 48/92* (2019.01)
  *B29C 48/30* (2019.01)
  *B29C 48/09* (2019.01)
  *B29C 48/13* (2019.01)
  *B29C 48/06* (2019.01)
  *B29C 48/00* (2019.01)
  *B29C 43/22* (2006.01)
  *B29C 48/25* (2019.01)
  *B29L 31/34* (2006.01)

(52) U.S. Cl.
  CPC .............. *B29C 48/06* (2019.02); *B29C 48/09* (2019.02); *B29C 48/13* (2019.02); *B29C 48/154* (2019.02); *B29C 48/303* (2019.02); *B29C 48/92* (2019.02); *B29C 48/2528* (2019.02); *B29C 2948/9258* (2019.02); *B29L 2031/3462* (2013.01)

(56) References Cited

U.S. PATENT DOCUMENTS

| | | |
|---|---|---|
| 5,383,998 A | 1/1995 | Lupke |
| 6,719,942 B1 | 4/2004 | Triplett et al. |
| 7,798,796 B2 | 9/2010 | Lupke et al. |
| 2006/0119013 A1 | 6/2006 | Haraguchi et al. |
| 2015/0217708 A1 | 8/2015 | Adachi et al. |
| 2018/0117820 A1 | 5/2018 | Ernst et al. |

FOREIGN PATENT DOCUMENTS

| | | |
|---|---|---|
| CN | 1615214 A | 5/2005 |
| CN | 101790449 A | 7/2010 |
| DE | 2940723 A1 | 4/1981 |
| DE | 19845321 A1 | 4/2000 |
| EP | 0005104 A1 | 10/1979 |
| GB | 971021 A | 9/1964 |
| JP | H0994866 A | 4/1997 |
| JP | 2014218028 A | 11/2014 |
| WO | 2016188900 A1 | 12/2016 |

\* cited by examiner

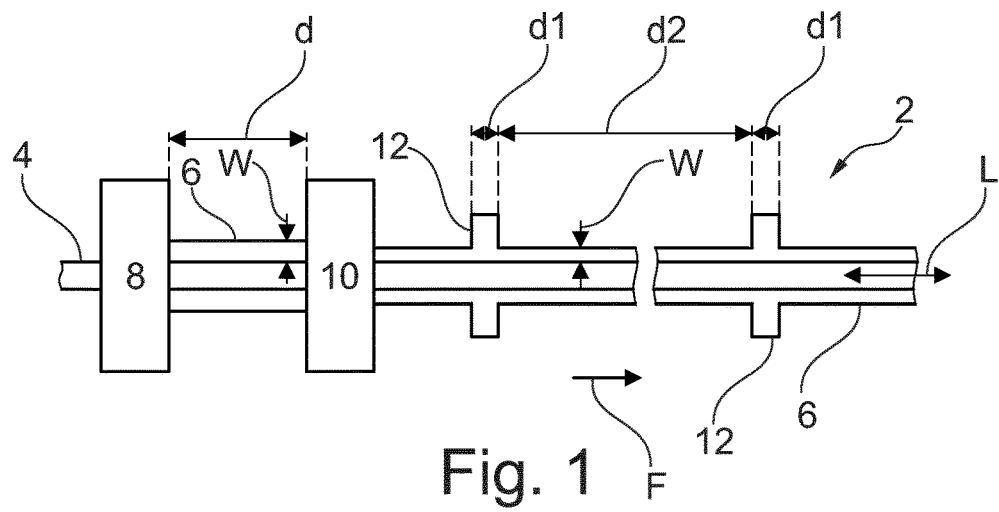
Fig. 1
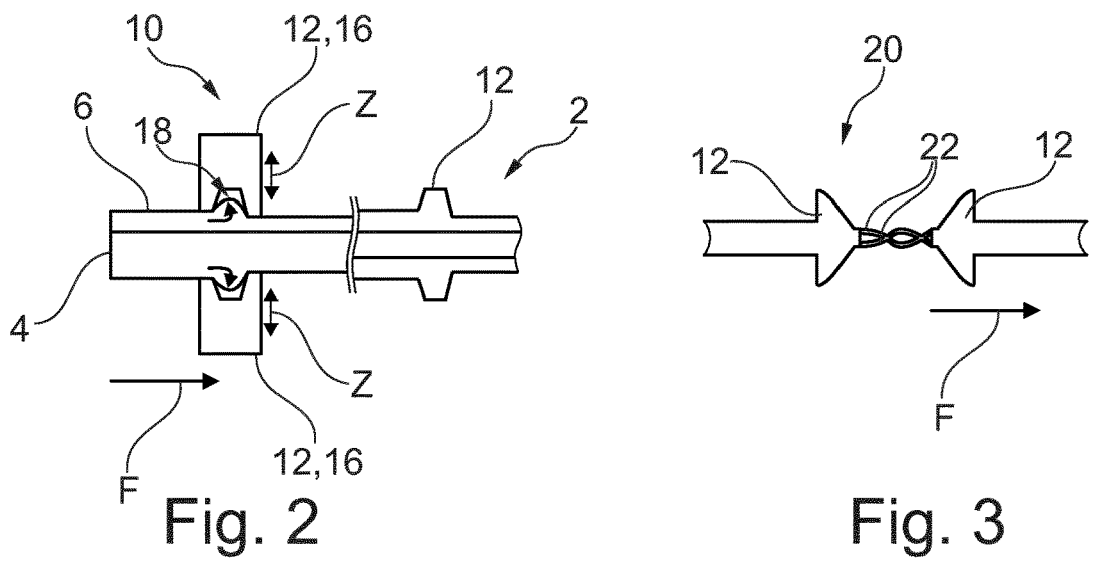
Fig. 2
Fig. 3
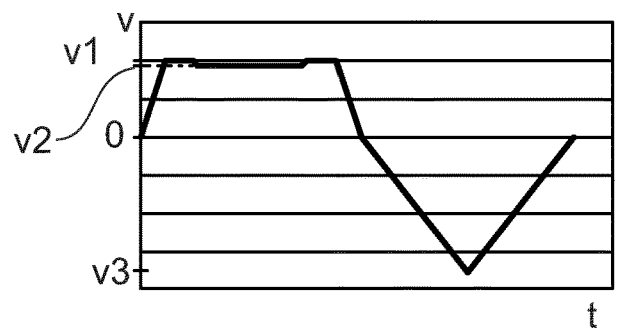
Fig. 4A

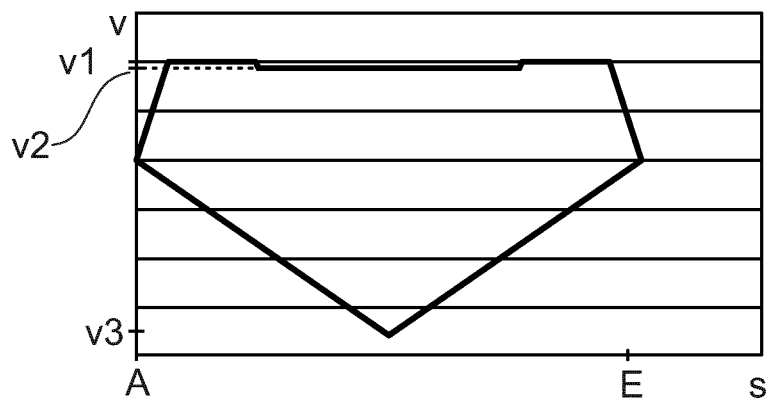
Fig. 4B
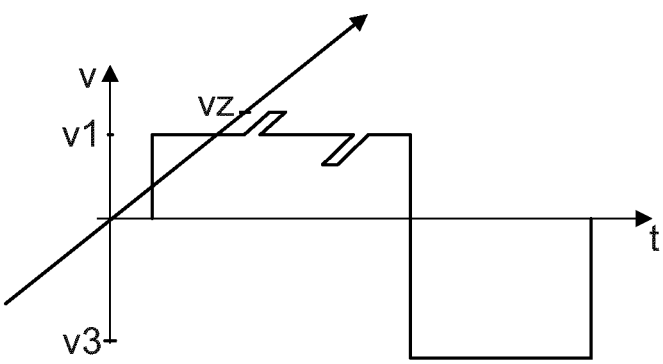
Fig. 5
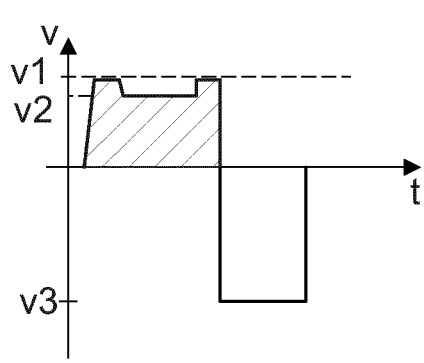 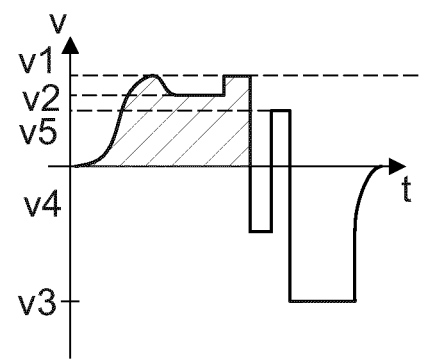
Fig. 6A      Fig. 6B

METHOD AND APPARATUS FOR PRODUCING AN EXTRUDATE

BACKGROUND OF THE INVENTION

Field of the Invention

The invention relates to a method and apparatus for producing an extrudate.

Extrudate here refers to stretched components produced by means of an extrusion process, in particular as continuous material. The term "extrudate" is used here to refer in particular to (electrical) cables as well as hoses. In both cases, the extrudate has an (outer) sheath formed by the aforementioned extrusion process.

The extrudate generally has a core to which the sheath is applied. In the case of a hose, for example, the core has a cavity. In the case of a cable, the core is a cable core with at least one electrical line. Depending on the cable type, the cable core may have a wide variety of structures. The cable is often fitted with molded parts such as for example connector housings, grommets, seals or combinations thereof.

Hoses are usually multi-layered, and the outermost layer forms the above-described sheath. This sheath is accordingly applied to a hose core consisting of a multi-layer structure. The hose core is typically hollow. Such a hose is also used, for example, to guide electrical cables or lines within the cavity or to guide fluid. The hose sheath is also fitted with molded parts, for example in a connection area.

The applicant's post-published PCT/EP 2016/061426 discloses a method for producing such an extrudate, in which a respective molded element is formed from the still moldable material of the sheath with the aid of a molding unit immediately after the sheath emerges from an extrusion unit. For this purpose it is provided that the molding unit, which has two mold halves formed as mold cavities, is fed in the radial direction and that part of the sheath material is scraped off as it were to accumulate material so that the mold cavities are filled with the material for molding the molded part.

With regard to a continuous process, rotary approaches are envisioned in which the mold cavities are circulated for example on a disc or by means of a rotary belt. In general, it has been found that accumulating material during the molding process exerts considerable pressure, which creates a risk of the individual mold halves being pressed apart. To solve this problem, a counter-pressure apparatus, especially a counter-pressure plate, may be designed and arranged, such that during the molding process the counter-pressure apparatus exerts an (additional) counter-pressure toward the extrudate on the molding unit, in order to hold it reliably at the desired position relative to the extrudate during the molding process.

In general, it is desired to integrate such a molding process for forming molded parts into a conventional extrusion process with the customary extrusion speeds, in order to enable a customary line speed for producing the extrudate.

SUMMARY OF THE INVENTION

Accordingly, the object of this invention is to enable forming an extrudate with an integrally molded part in a reliable process and at high speed.

This problem is solved according to the invention by a method with the features as claimed and by an apparatus as claimed. The dependent claims set forth preferred configurations. The advantages and preferred configurations mentioned with regard to the method also apply analogously to the apparatus.

The method is used to produce an extrudate, especially a cable or a hose, that has a sheath that is extruded with a given wall thickness by means of an extrusion unit. In a feeding or extrusion direction downstream of the extrusion unit, a part of the still moldable material is then accumulated with the aid of a molding unit during a molding process, so that a molded part is formed integrally on the sheath. In this case, the molding unit is moved according to a specified work cycle that comprises the following steps: The molding unit is first accelerated in the feed direction from a start position and is synchronized to a line speed at which the sheath is extruded. The molding unit typically has zero velocity at the start position. The molding unit is then advanced toward the extrudate. This is generally understood to mean that the molding unit is positioned in such a way that it engages in the still moldable material of the sheath so that the desired accumulation of the material occurs and especially so that the molded part is formed. During the molding process, the molding unit is therefore in the advanced state. After the molding process, the molding unit is retracted from the extrudate so that the molding unit no longer engages with the sheath. Finally, the molding unit is decelerated and moved counter to the feed direction, from an end position back to the start position.

The process cycle or work cycle is therefore characterized by a sequence of positive and negative accelerations of the molding unit to periodically move it back and forth between the start position and the end position. In a speed-vs-time diagram, the sum of all areas above and below a speed curve, each of which respectively indicates the distance traveled, would therefore in particular be zero.

Expediently in this case, the molding unit is moved linearly between the start position and the end position along a linear guide. Overall, it has been shown that such a design with the molding unit traveling along a linear path in and counter to the conveyor apparatus to form a periodically recurring working section may be implemented particularly easily, from a process standpoint, in order to achieve the desired high process speeds and in particular also to be able to form a sufficiently robust apparatus that is especially able to withstand the high counter-pressures during the molding process. Especially, the design of the linear guide allows the forces to be reliably absorbed. In addition to the pressures during the molding process, this also applies in particular to the dynamic loads due to the high process speeds and the consequently high accelerations that are required for the molding unit.

It is also expediently provided that during the work cycle, the molding unit is moved during the molding process at a molding speed that differs from the line speed. This molding speed is either higher or lower than the line speed, so that a relative speed is established between the molding unit and the extrudate such that the desired accumulation occurs within the molding unit.

The line speed in this case is preferably in the range between 0.1 m/s or 0.5 m/s to 4 m/s and in particular is about 2 m/s.

In a preferred configuration, the molding unit is first accelerated from the start position to the line speed, so that the relative speed is zero initially. Subsequently, the molding unit is advanced toward the extrudate, and in consequence, a run-in is ensured that is oriented perpendicular to the feed direction; in particular, defined surfaces may be formed for the molded part. After the molding unit has been advanced, i.e. after it has been at least partially inserted into the material of the sheath, the molding unit is accelerated and brought to the molding speed. "Acceleration" here generally refers to either a positive acceleration or a negative acceleration (deceleration). Transfer to molding speed preferably is done at a maximum acceleration.

In that case, there is a difference between the molding speed and the line speed, this difference being in the range of 0.01 m/s to 0.3 m/s and in particular 0.05 m/s to 0.2 m/s. The difference is preferably about 5 to 20% and in particular about 10% of the line speed.

According to a first embodiment, the molding speed is constant during the molding process. In an alternative configuration, the molding speed varies during the molding process. Here, for example, a continuous increase or decrease of the molding speed is envisioned. In particular, it is also envisioned that the molding speed is changed in such a way that it is higher than the line speed in a first section and lower than the line speed in a second section. This therefore enables accumulation in or against the feed direction. In general, by adjusting the molding speed, particularly in combination with the geometry of the molding unit, different profiles and shapes may be set for the molded parts to be formed.

After the molding process, the molding unit is withdrawn from the extrudate. In the following, this process is also referred to as "demolding." Expediently, it is envisioned that before this demolding process, the molding unit is brought from the molding speed to a demolding speed. In consequence, generally, the molding unit is moved away relative to the molded part at least slightly in or against the feed direction before demolding takes place. Expediently, in this case, the demolding speed is the line speed, so that the relative speed between the molding unit and the extrudate returns to zero again. In this variant, for example, an exact 90° demolding is possible. In principle, however, other demolding speeds may also be provided, so that, for example, special demolding contours may also be formed.

According to a first preferred configuration, the starting and/or end position is identical over a plurality of work cycles and preferably over all work cycles. In particular, the start position and end position are identical. This means that in each work cycle, the molding unit respectively travels from the identical start position to the identical end position and back again. This is especially the case when forming identical molded parts that repeat periodically.

In an alternative configuration, the starting and/or end position varies between two consecutive work cycles, or intermediate positions are approached during a work cycle. Therefore, in an alternative configuration several working and/or end positions or intermediate positions are formed. Expediently in this case, only a limited number of different working and/or end positions are furnished, for example a maximum of three different working positions and/or three different end positions. Different working and/or end positions are furnished in particular if different molded parts are to be used that differ, for example, in size or shape. Alternatively, different starting and end positions are also furnished at different distances between two successive molded parts.

In general, the method described herein is used to create periodically recurring structures. A complete work cycle is envisioned that may preferably be divided into several work cycles, with a plurality of complete work cycles following one another, and with there being an identical sequence of preferably a plurality of molded parts, which in particular may be formed differently, in a complete work cycle.

For example, a defined cable section is produced with a complete cycle and the complete cable extrudate is separated according to such a cable section and prefabricated with plugs etc. if necessary. Such a cable section later forms a defined length for a cable set.

The distance between a respective start position and the end position defines a total travel path (in one direction) for the molding unit. This distance is preferably only in a range from 0.5 m to 5 m, and particularly in a range from 1 m to 2 m.

In addition to the linear movement in or counter to the feed direction, an advancing movement toward or away from the extrudate is also required. This advancing is preferably exactly perpendicular to the feed direction. In addition to the (linear) drive for the linear movement in/against the feed direction, an additional advance drive is designed for this advancing movement. The overall movement of the molding unit is therefore effected by the combination of two movements, in particular linear movements, both in/against the feed direction and in/against the advance direction perpendicular to the feed direction.

BRIEF DESCRIPTION OF THE SEVERAL VIEWS OF THE DRAWING

The following drawings explain the variant embodiments of the invention in greater detail. The drawings show the following, in partially simplified form:

FIG. 1 An extrudate that is fed through an extrusion unit and an apparatus for forming molded parts FIG. 2 An enlarged partial view of the area of the apparatus with a molding unit, FIG. 3 An exemplary side view of a cable with molded parts, FIG. 4A A speed-time diagram (v-t-diagram) for one work cycle of the molding unit, FIG. 4B A speed-displacement diagram (v-s diagram) associated with FIG. 4A, FIG. 5 A simplified speed-time diagram with a third axis for the advance movement at an advancing speed.

FIGS. 6A to 6D Different speed-time diagrams to illustrate different work cycles, FIG. 7 An exemplary illustration of an apparatus with the linearly movable molding unit.

Figure 6C:
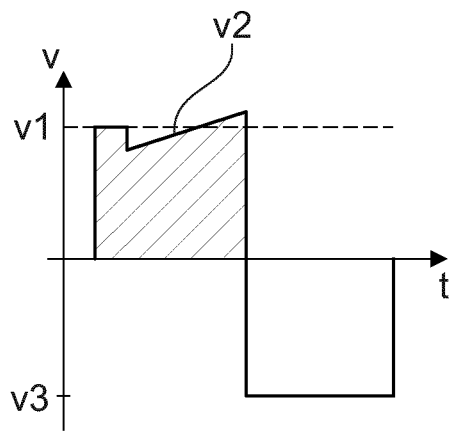

In the drawings, parts that have the same effect are assigned the same reference signs.

DESCRIPTION OF THE INVENTION

The basic steps in the method of producing an extrudate 2 by accumulating material are first explained with reference to FIG. 1. In longitudinal section, this drawing shows the extrudate 2, or elongated article, that extends in a longitudinal direction L, which surrounds an inner core 4 and a sheath 6 applied to the core. The extrudate 2 here is configured as a cable, with a core that is correspondingly a cable core and, for example, has one or more conductors, wires, lines and/or partial cables. Alternatively, the extrudate 2 is a hose and the core 4 is then correspondingly a hose core. In the exemplary embodiment shown here, the sheath 6 is in particular an outer sheath of the extrudate 2. The extrudate 2 may be da semi-finished product and may be further processed. To apply the sheath 6, the core 4 is first fed to an extrusion unit 8 in a feed direction F. By means of this, a given material, usually a plastic, is extruded onto the core 4 as a sheath 6.

In the feed direction F, the extrusion unit 8 is followed by an apparatus 10 for molding molded parts 12. The extrusion unit 8 and the apparatus 10 are part of a production line through which the extrudate is guided at a line speed. The line speed, in particular the extrusion speed, and a distance d between the molding unit 10 and the extrusion unit 8, are selected such that the material of the sheath 6 is still moldable when it reaches the apparatus 10. By means of this apparatus 10, at least a part of the material of the sheath 6 is accumulated and used to form the molded part 12. The molded part 12 is formed directly from the material of the sheath 6 of the extrudate 2. The material of the sheath is therefore scraped off from the initially finished sheath 6 and accumulated to form the molded part.

FIG. 1, by way of example, shows a molded part 12 shaped as a cylindrical thickening of the sheath 6. In addition, this molded part is only formed on a certain section d1 of the extrudate 2, to which are connected extrudate sections d2, the sheath 6 of which has a substantially uniform wall thickness W. In the exemplary embodiment shown here, a plurality of molded parts 12 are also formed at periodically recurring positions longitudinally, so that between two molded parts 12 following one another in the longitudinal direction L there extends a extrudate section Ad having a certain length that is in particular unaffected by the molding unit 10. To form the molded parts, the apparatus 10 comprises a molding unit 14, as illustrated in greater detail in FIG. 2.

The molding unit 14 is designed in particular in several parts and comprises in particular two mold halves, which are referred to as mold cavities 16. The two mold cavities 16 are preferably moved synchronously to each other. In total, the molding unit 14 is moved linearly in the feed direction F and perpendicularly in an advance direction Z, in particular perpendicular to the feed direction F, and as a result is advanced to the sheath 6. In this case, the respective mold cavity 16 preferably only partially retracts into the sheath 6 and the molding unit 10 is virtually closed off. Due to a difference in speed between the molding unit 14 and the extrudate 2, sheath material is scraped off and accumulated, which is collected in a molding chamber 18 of the molding unit 14, so that the chamber is preferably completely filled with the material. The molding unit is then opened again by restoring the mold cavities 16, so that a molded part 12 with a defined contour is formed according to the requirements of the molding chamber 18.

The molding unit 12 shown in FIG. 2 is used for variants in which the speed of the extrudate 2 in the feed direction F is faster than the speed of the molding unit 14, so that a reverse accumulation occurs. In principle, however, it is also possible to move the molding unit 14 at a higher speed than the extrudate 2 in a feed direction F, so that there is accumulation at the front, also referred to as pushing. In principle, the molding unit shown in FIG. 2 may also be used to produce a pushed-on molded part 12 with a mirror-image design or rotation.

FIG. 3 shows a variant of a cable 20 as an extrudate 2 in which two molded parts 12 are formed in the manner of grommets, which for example have a trapezoidal cross-section. In this embodiment, individual wires 22 of the cable 20 are exposed between the two molded parts 12. In this variant, not only is part of the sheath 6 scraped off, but in fact the whole sheath material is accumulated. As is apparent, the molded parts are manufactured in mirror image relative to a plane formed perpendicular to the feed direction F. The molded part 12 shown on the right side is produced by pushing and the molded part 12 shown on the left half of the image is produced by a backward accumulation.

To produce the molded parts 12, the molding unit 14 or plurality of molding units 14 is moved according to a predetermined work cycle. In particular, in this case, two linear travel paths are superimposed. On the one hand, the molding unit 14 is moved linearly in and counter to the feed direction F. In addition, the molding unit 14, in particular the mold cavities 16, is also moved perpendicular to it in or counter to the advancing direction Z. The respective work cycle is explained in greater detail below, initially with reference to FIGS. 4A and 4B.

At the beginning of the work cycle at a start position A, the molding unit 14 initially has zero speed. From this zero speed, in a first step it is preferably accelerated at the maximum possible acceleration to a speed vi, which is in particular the line speed at which the extrudate 2 is fed in the feed direction F. This speed is 2 m/s in the exemplary embodiment. In a second step, the speed vi is maintained. During this time, an advance movement takes place toward the extrudate 12, so that the mold cavities 16 at least partially engage in the sheath material. Subsequently, the molding unit 14 undergoes another acceleration, in the exemplary embodiment a deceleration, likewise preferably at the maximum negative acceleration, so that a molding speed v2 is obtained that differs from the line speed vi. The difference, for example, is from 0.05 m/s to 0.2 m/s. Due to this difference, the molding chambers 18 become filled with sheath material. In the variant embodiment of FIGS. 4A and 4B, the molding speed v2 is therefore maintained for a certain duration until the molding chamber 18 is preferably completely filled. This step is also known as the molding process.

After completion of the molding process another acceleration takes place, in this case a positive acceleration, again preferably at a maximum positive acceleration, to a demolding speed that preferably is the line speed vi again, and this speed is then maintained for the demolding process. During the demolding process, the mold cavities 16 are opened counter to the advance direction Z. As soon as the molding unit 14 is fully opened, another acceleration takes place in another step, namely deceleration of the mold unit 14 to zero and acceleration to a negative, in particular maximum, backward speed v3. This speed is preferably greater than the line speed, in particular by a factor of 1.5 to 2. Different acceleration values may be adopted during the deceleration process. Deceleration to zero preferably takes place again with the maximum possible negative acceleration. The subsequent acceleration to backward speed, for example takes place with somewhat less negative acceleration. The backward speed v3 is negative compared to the line speed vi, i.e. the molding unit 14 is moved back toward the start position A again. When the speed reaches zero, the molding unit 14 reaches an end position E of the work cycle as the maximum position in the feed direction F. The molding unit 10 is again decelerated from the reverse speed v3 to zero speed. At this point the start position A is reached again. The start position A and end position E are separated by a distance a of for example 1-3 m.

The maximum positive and negative accelerations are preferably the same. The maximum accelerations are preferably in the range from 20 to 50 m/s² or also up to 100 m/s² and in particular 40 m/s².

The work cycle then starts over again.

In FIG. 5, the advance speed vz of the second linear movement in the advance direction Z or against the advance direction Z when the mold cavities 16 are retracted or when the mold cavities 16 are opened is also shown on an additional axis, using a simplified speed-time diagram. In both cases, the respective mold cavity 16 is moved at maximum possible acceleration perpendicular to the feed direction F, is decelerated to reach the retracted position, and remains in this position. Conversely, i.e. when moving outward, the mold cavity remains in the retracted position.

In connection with FIGS. 6A to 6D, different speed-time diagrams are shown. FIG. 6A shows a travel cycle similar to the speed profile shown in FIG. 4A, at least until the molded part 12 is formed. Deceleration in this case takes place up to reverse speed v3, which is then maintained for a certain period of time. In FIGS. 6A to 6C, the accelerations are partly drawn as vertical lines. This is an idealized representation and should only indicate a maximum acceleration. The variant embodiment of FIG. 6B shows a situation in which, for example, the acceleration to the line speed vi in the first step traverses a predefined curve. The accelerations to reach the molding speed v2 may also vary.

It should be emphasized that FIG. 6 shows a variant of a complete cycle, which is composed of two superimposed partial cycles. After formation of the first molded part 12, the molding unit 14 is decelerated to a negative speed v4 and moved back one piece relative to the extrudate 2; however, it is not moved back to the original start position but rather to a second start position for the molding unit 10. From this position, it is again positively accelerated to a positive speed v5 that is lower than the molding speed v2.

An additional advance movement may be superimposed on this additional step, so that, for example, an additional molded part 12 is formed, for example a molded part 12 that is smaller than the first molded part 12. Only after this does the unit return to the original start position A by decelerating once more. Overall, the sum of the areas above and below the zero speed is identical.

Figure 6D:
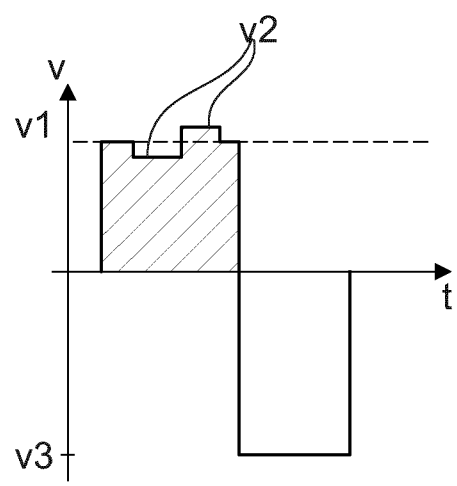

The variant embodiments of FIG. 6C, 6D show two situations in which a variable molding speed v2 or different but constant molding speeds v2 are adopted during the molding process. In the embodiment of FIG. 6C, for example, after braking to a minimum molding speed v2, a continuous, particularly linear, increase of this molding speed v2 is envisioned. In particular, there is an increase up to a speed greater than the line speed vi. With this measure, it is therefore possible to achieve backward accumulation as well as frontal pushing using the advanced molding unit 12.

Expediently, the frontal pushing occurs first, followed by backward accumulation. In contrast to FIG. 6C, in this case, a molding speed v2 above the line speed vi is initially set, and is subsequently reduced.

FIG. 6D shows a similar situation, but here the molding speed v2 is not continuously varied. Instead, a first section 34 is furnished with a molding speed v2 below the line speed vi, and a second section 36 is furnished with a molding speed v2 above the line speed vi.

This arrangement may also be used to accumulate and push back two molded parts 12 that are separated from each other in the feed direction F, for example the cable 20 shown in FIG. 2. In this case—contrary to the illustration in FIG. 6D—it is preferred initially to use the high molding speed v2 to push back the two molded parts 12 shown in FIG. 2 and then to accumulate the two molded parts at the rear by means of the lower molding speed v2.

In total, such a travel arrangement within the framework of a work cycle with two linear movements mounted on top of each other makes possible a very wide variety of speed profiles and thus travel profiles, so that different molded parts 12 may also be formed.

Figure 7:
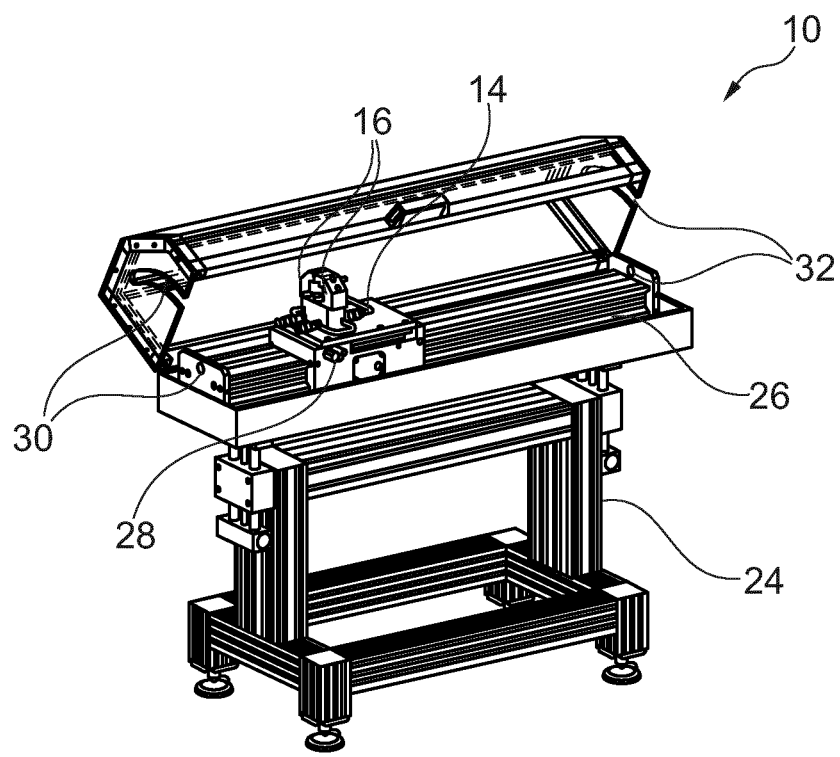

FIG. 7 shows a variant of the apparatus 10 by way of example. The entire apparatus 10 has a length L that is only slightly greater than the distance a between the start position A and the end position E. For example, the length L is only 10% to 30% longer than the distance a. The apparatus 10 in the exemplary embodiment has a support frame 24, which is preferably fixedly connected to a floor. A linear guide 26 is arranged on this support frame 24. On this linear guide 26, a carriage 28 is arranged that may be displaced in the feed direction F. The carriage 28 may be moved between the start position A and the end position E. The molding unit 14 is arranged on the carriage 28, which is therefore moved with the carriage 28.

In manner not otherwise shown, a drive, in particular a linear drive, especially an electromotive linear drive, is provided for moving the carriage 28 along the linear guide 26. In addition, an advance drive is provided that is not otherwise shown herein and ensures the advance movement of the two mold cavities 16 in the advance direction Z. The entire device 10 also has an entry opening 30 and an exit opening 32 through which the extrudate 2 is introduced into or removed from the apparatus 10.

As indicated in FIG. 1, the apparatus 10 is integrated into a production line for producing the extrudate 2. The molded parts 12 are therefore continuously formed at periodically recurring intervals on a virtually endless extrudate 12, as part of an inline process.

The invention claimed is:

1. A method for producing an elongated article with a sheath, the method comprising:
   extruding the sheath with a predetermined wall thickness by an extrusion unit;
   following the extrusion unit in a feeding direction and while a molding material is still moldable, building up a part of the still moldable material with a molding unit during a molding process, to form a molded part integrally on the sheath, and thereby moving the molding unit according to the following work cycle:
   accelerating the molding unit from a start position in the feeding direction;
   advancing the molding unit toward the elongated article with the molding unit engaging in the still moldable material of the sheath to cause a desired accumulation of the material to form the molded part;
   retracting the molding unit from the elongated article;
   decelerating the molding unit and moving the molding unit from an end position back toward a start position, counter to the feeding direction; and
   thereby conveying the elongated article at a predetermined line speed in the feeding direction and moving the molding unit during the molding process at a molding speed that is different from the line speed, and
   forming the molded part directly from the material of the extruded sheath by scraping off the material of the sheath from the initially finished sheath accumulating the material to form the molded part.

2. The method according to claim 1, which comprises moving the molding unit linearly along a linear guide.

3. The method according to claim 2, which comprises moving the molding unit between the start position and the end position with a linear drive.

4. The method according to claim 1, wherein the line speed lies in a range from 0.1 m/s to 4 m/s.

5. The method according to claim 4, which comprises setting the line speed to 2 m/s.

6. The method according to claim 1, which comprises first accelerating the molding unit to the line speed, then advancing the molding unit toward the elongated article material, and then bringing the molding unit to a molding speed.

7. The method according to claim 1, wherein the molding speed is different from the line speed by a differential in a range of 0.01 m/s to 0.3 m/s.

8. The method according to claim 1, which comprises keeping the molding speed constant during the molding process.

9. The method according to claim 1, which comprises varying the molding speed during the molding process.

10. The method according to claim 1, which comprises during the molding process, keeping the molding speed in a first portion higher than the line speed, and in a second portion lowering the molding speed to below the line speed.

11. The method according to claim 1, which comprises, after the molded part has been formed and before the molding unit is withdrawn from the elongated article, moving the molding unit from the molding speed to a demolding speed.

12. The method according to claim 11, which comprises setting the demolding to equal the line speed.

13. The method according to claim 1, which comprises maintaining the start position and the end position identical over a plurality of work cycles.

14. The method according to claim 1, which comprises defining a plurality of working positions and/or end positions, thus enabling a formation of different molded parts.

15. The method according to claim 1, which comprises setting a distance between the initial position and the end position to within a range from 0.5 to 5 m.

16. The method according to claim 15, which comprises setting the distance between the initial position and the end position 1 to 2 m.

17. The method according to claim 1, which comprises advancing toward the elongated article and then back again perpendicular to the feeding direction.

18. The method according to claim 1, wherein only a single molding unit is used.

\* \* \* \* \*